No. 607,476. Patented July 19, 1898.
F. H. RICHARDS.
WEIGHING MACHINE.
(Application filed Oct. 11, 1897.)
(No Model.) 4 Sheets—Sheet 1.

Fig. 1.

Witnesses: Inventor:
D. S. Hawkins. F. H. Richards
Fred. J. Dole.

No. 607,476. Patented July 19, 1898.
F. H. RICHARDS.
WEIGHING MACHINE.
(Application filed Oct. 11, 1897.)

(No Model.) 4 Sheets—Sheet 2.

Witnesses: Inventor:
D. S. Hawkins. F. H. Richards.
Fred. J. Dole.

No. 607,476. Patented July 19, 1898.
F. H. RICHARDS.
WEIGHING MACHINE.
(Application filed Oct. 11, 1897.)
(No Model.) 4 Sheets—Sheet 3.

Fig. 4.

Witnesses:
D. S. Hawkins
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 607,476, dated July 19, 1898.

Application filed October 11, 1897. Serial No. 654,841. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to improvements in weighing-machines, and especially to automatic weighing-machines of that class adapted for weighing automatically predetermined quantities of material, and while the machine embodying my present improvements may be employed for the purpose of weighing in this manner granular or pulverulent material it is especially adapted and intended for use as a medium for weighing heavy or sluggish liquids or viscid materials—such, for example, as lard, molasses, oil, varnish, &c. As materials of this kind are ordinarily put upon the market in packages in the form of cans, pails, or buckets it will be obvious that a machine constructed for weighing these liquid and semiliquid substances should have a load-receiver or package-carrier of such a type as to permit the can, pail, or bucket to be supported thereon while the liquid flows thereinto. Moreover, as the weight of the cans or packages frequently varies considerably in actual practice it will be obvious that if the weighing mechanism is set for weighing a determined load, which load will of course include the can or package as a part thereof, the mass of material delivered into such package or can will vary in a corresponding manner, and instead of the amounts weighed out being absolutely uniform in weight the contents of some of the packages would be either under weight or over weight if no provision were made for determining exactly the true weights of the several packages or cans placed upon the load-receiver or package-carrier of the weighing means.

One of the main features of my present invention is the provision, in connection with suitable automatic primary weighing means or mechanism, of secondary weighing means or mechanism, which will usually be mounted upon the poising side of the beam mechanism and will be employed as a means for weighing the packages or cans prior to the delivery of material thereinto. It will be obvious that if any one of the cans which may be placed upon this secondary weighing mechanism is over or under weight this fact will be indicated if the secondary weighing mechanism has been adjusted for a predetermined weight of can or package corresponding to the normal or standard weight. By the use of such a supplementary or secondary mechanism as this all of the cans or packages that are of faulty weight may be detected and such packages or cans rejected and set aside to be used later with the secondary weighing mechanism readjusted therefor, such readjusting or regulating means for enabling the secondary weighing mechanism to operate with a package or can of any desired predetermined weight (within limits) constituting an essential feature of this part of my present improvements.

As the material-receiving package or receptacle is intended to be supported on the secondary weighing mechanism during the operation of the machine it will be clear that the two automatic weighing means have a common load-receiver or package-carrier supported on the poising side of the secondary weighing mechanism, which in turn is mounted on the poising side of the primary weighing mechanism, and thus forms part of the poising means of the weighing mechanism considered as a whole.

It will be obvious, of course, that the movement of the secondary weighing mechanism relatively to the primary weighing mechanism may be somewhat limited, and that this movement should be controlled by suitable stopping means usually on such primary weighing mechanism.

The improved weighing-machine forming the subject-matter of my present invention is intended to be governed in its operation by suitable electrically-operated devices, and another important feature of such invention is the provision, in connection with the devices before referred to, and in connection also with other devices to be described more particularly hereinafter, of suitable circuit-controllers governed in their operation by one or more poising devices constituting a part or parts of the weighing mechanism. The secondary weighing mechanism just described forms one of these poising devices and governs one of these circuit-controllers, while another circuit-controller may have its movements determined by another poising device coöperative with the main portion of the weighing mechanism—that is to say, the primary weighing mechanism—and may be operative in substantially the same manner as the poising devices shown in patents hereinbefore granted to me for assuring the descent of the poising side of the beam mechanism below the poising-line thereof.

In the construction illustrated in the drawings of my present application the circuit-controllers governed by these poising devices will determine the cutting off and the turning on of the stream of material to be delivered to the package or receptacle on the load-receiver or package-carrier of the weighing means, which receiver or carrier is in this case mounted on the secondary weighing mechanism, one of such circuits being governed by the movements of the receiver or secondary weighing mechanism relatively to the mechanism on which it is supported. It will be clear now that if there are two breaks, for instance, in an electric circuit including a source of energy and controlling the operation of the stream-controlling or valve mechanism, one of which breaks is normally closed and is controlled by the primary weighing mechanism or by the poising device that coöperates therewith to assure the descent of the poising side of the weighing mechanism, while the other break is normally open and is controlled by the secondary weighing mechanism, such secondary mechanism may be employed to close this normally open break in the circuit when a package or receptacle is placed upon the receiver or package-carrier and only when this package or receptacle is of a proper weight—that is, of a weight sufficient to cause the secondary weighing mechanism to move relatively to the primary weighing mechanism on which it is mounted. Manifestly in a machine constructed to operate in this manner the circuit-controller governing the opening of the valve for supplying a stream to the package or receptacle would be operated to effect this result by placing upon the receiver a package or can of the proper or standard weight.

In automatic machines illustrated in prior patents granted to me I have shown poising devices normally carried on the weighing mechanism and forming a slight addition to the weight of the counterpoising side of such mechanism for the purpose of assuring the descent of the poising portion of the weighing means below the poising-line before the supply of material is shut off, and this poising device has usually been shifted off from the weighing mechanism on the descent of the latter to the poising-line.

A poising device operative substantially in the above manner is illustrated herein, and as this device is usually shifted onto the framework at the moment that the charge in the receiver, plus the amount then in the air, would make a true load, it will be apparent that said poising device may be used as a means for operating a circuit-controller governing the closing of the valve and the shutting off of the supply, and it is so illustrated herein, this poising device serving to open by such movement a normally closed break in a circuit to a solenoid constituting a valve opening and closing actuator.

Other features of my present improvements relate to the construction and operation of such a solenoid, to the manner in which it is organized with respect to the supply-spout, to the construction of an improved poising device of the type just described, and to other details, which will be referred to more particularly hereinafter.

In the drawings accompanying and forming part of this specification.

Similar characters designate like parts in all the figures of the drawings.

Any suitable body or base may be employed for supporting the several operative parts of my improved weighing-machine. In the present instance this base, which is designated herein by 3, is preferably hollow in order to reduce the weight thereof, and has rising therefrom a pair of bearings, such as 4, and a third bearing 5 of the V-shaped type, the former pair being relatively large and being intended to support the weighing mechanism, while the last is relatively small and will support one of the poising devices, in this case the poising device which is shiftable onto the support or bed of the machine on the overpoising of the weighing mechanism.

The weighing means or mechanism embodies two main parts and a third coacting therewith. The two main parts are the primary weighing mechanism or beam mechanism (designated in a general way by B) and the poising device or secondary weighing mechanism or beam mechanism, (designated in a general way by B',) while the third part is the poising device, that is herein designated by $p$.

The primary and secondary weighing mechanisms may be of any suitable construction; but in this case the primary mechanism will embody a pair of beam-arms, such as 6 and 6', supported by the usual knife-edge pivots on the bearings 4 and connected at their rear ends by the usual counterpoise or counterweight W.

In the construction illustrated the secondary weighing mechanism or beam mechanism is mounted on the poising side of the primary beam mechanism, so as to move therewith, while having a proper range of movement relatively thereto for the purpose of determining the weight of the cans or other packages placed thereon. In this instance the beam-arms 6 and 6' have bearings 7 and 7' at the ends thereof, and in these bearings is mounted a shaft 8, to which are secured the two arms of the secondary beam mechanism. One of these arms, which is indicated by 9, constitutes the counterpoising beam-arm or scale-arm of the secondary weighing mechanism and has a counterpoise or counterweight 9' thereon. The position of this counterweight may be varied at will by sliding the weight along the scale-arm 9, thus rendering it possible to set the secondary beam mechanism so that it may be overpoised by packages or receptacles of any determined standard weight. At the rear end thereof the movement of the scale-arm and hence of the secondary weighing mechanism may be limited by suitable stop members on the main or primary weighing mechanism. In this instance the beam-arm 6' has a stop-arm 10 rising therefrom and a stop member 10' coöperative with a corresponding stop member 9'' on the scale-arm 9 to limit the descent of the poising side 12 of the secondary beam mechanism when a can or package is placed thereon.

Figure 2:
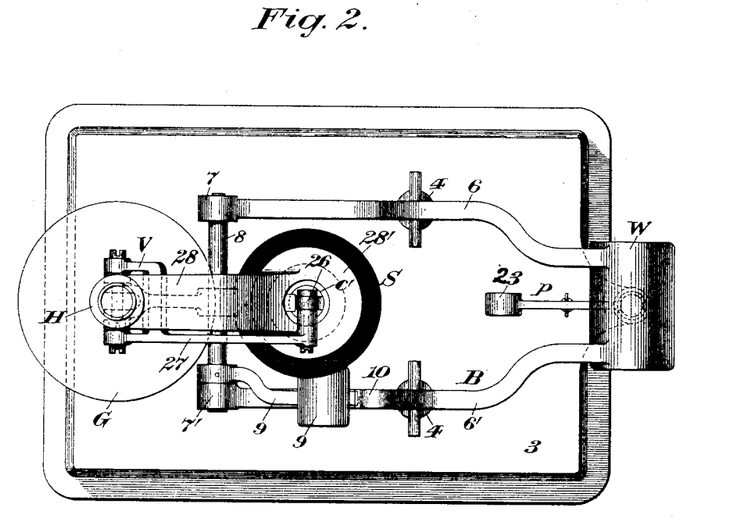
Fig. 2 is a plan of the same.

When there is no can in place, the rear end of the scale-arm will abut against a suitable stop-face, such as 6''', on the beam-arm 6'. The poising-arm of the secondary weighing mechanism is indicated at 12 and will usually be secured to the shaft 8, substantially centrally thereof, and will carry at its outer or forward end the load-receiver or package-carrier that is common to the two weighing mechanisms of the machine. Preferably the arm 12 will be forked at its forward end, as shown, for example, in Fig. 2, and will have a pair of V-shaped bearings, such as those shown at 13, in which, for the purpose of reducing friction, a load-receiver or package-carrier will be supported by knife-edge bearings, such as 14. This load-receiver is in the machine shown in the drawings of this case in the form of a substantially flat package-carrier (designated in a general way by G) supported at the upper end of a pivoted lever or hanger 15, to which the knife-edge pivot members 14 are secured. At its lower end the arm 15 may be guided by means of a link, such as 16, secured to a suitable part, such as 17, of the base of the machine, knife-edge bearings being preferably employed at opposite ends of this link to reduce the friction.

I may employ in the present case an improved type of poising device for compensating for the weight of the material that is in the air at the time the main beam reaches the poising-line. This device, which, as before stated, is indicated by $p$, coöperates in this machine with the counterpoising side of the weighing mechanism and is pivotally mounted on the bearing 5 of the support or base 3 of the machine, so as to have a point of support different from that of the primary beam mechanism and at a point on the counterpoising side of the latter. When the beam mechanism is in its normal position, this poising device is in position to exert its force in opposition to that of the counterpoise W, and hence by thus decreasing the efficiency of the counterpoise-weight the relative weight of the poising side of the beam mechanism is increased. Normally the stop-faces 20 and 20' at the rear end of the poising device $p$ are engaged, respectively, by a stop-face 21' of a stud 21 on the bed or base 3 and by a stop-face 22 at the under side of the rear end of the beam mechanism B.

Figure 1:
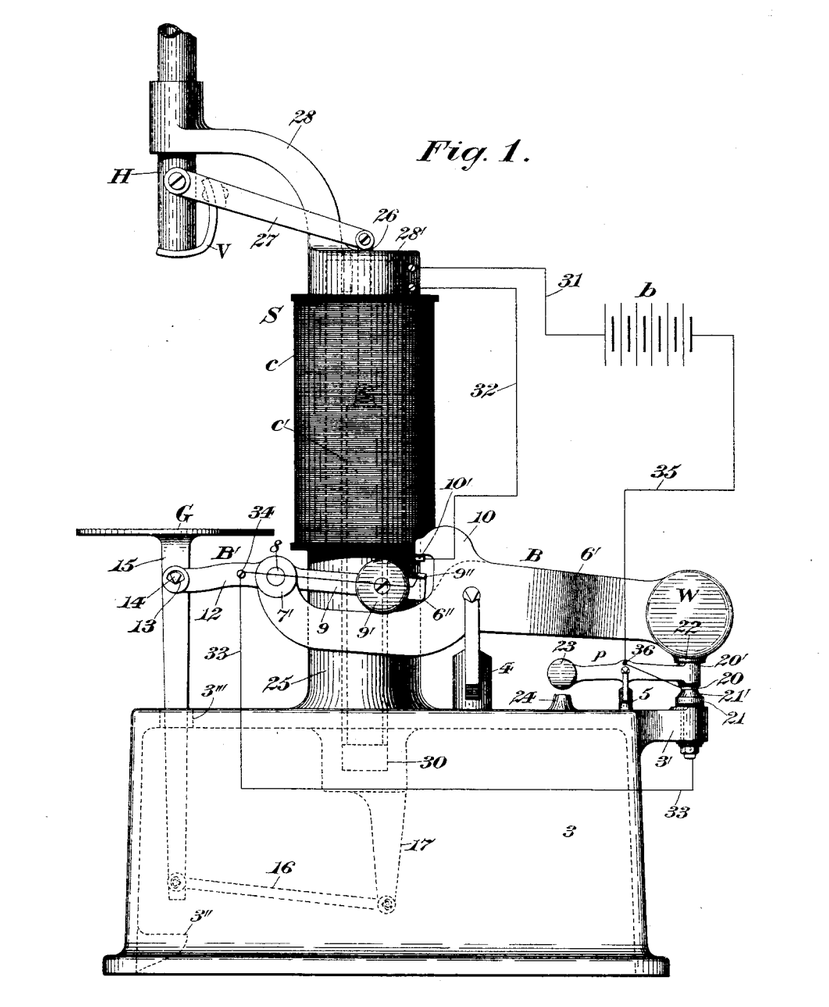
Figure 1 is a side elevation of a weighing-machine embodying my present improvements and illustrating the parts in their normal or idle positions with the stream-controlling means or valve closed to prevent the efflux of material from the supply-spout.

The poising device has a counterweight or counterpoise, such as 23, and the stop coöperative therewith is shown at 24 rising from the base 3. When in the position shown in Fig. 1, the counterpoise W of course presses this poising device down against the stud 21, thereby raising the counterweight 23 from the stop 24, while when the weight W rises the counterweight 23 will be engaged by the stop 24 and this poising device shifted entirely off from the weighing mechanism, of which, it will be obvious by reference to Fig. 1, such poising device constitutes a part when the machine is in its normal position.

The stream-controlling means or valve mechanism is mounted in the present instance on a column, such as 25, rising from and preferably forming an integral part of the base 3. This column is hollow and is of two diameters, so as to form a holder or spool on which the wire coils $c$ of a solenoid (designated in a general way by S) may be wound. The core of this solenoid, which is indicated by $c'$, (see Fig. 3,) is intended to reciprocate vertically in the bore of the hollow column and may be connected by means of a link 26 with a valve-operating lever 27, pivoted on the supply-spout H. This supply-spout may in turn be supported by a bracket 28, projecting from and secured to the upper end of the column 25, said bracket having a cap portion 28' for retaining the core of the solenoid in position. This solenoid and its operating connections with the stream-controller or valve, which is indicated herein by V and may be in the form of an oscillating valve adapted to close tightly under the mouth of the spout H, constitute a valve opening and closing actuator controlled by an electric circuit, which in turn is governed by the two poising devices. The valve is intended to be opened by the drawing in of the core $c'$ of the solenoid when the latter is energized, and the weight of this core should be sufficient to cause the core to close the valve by a gravital action when said circuit is broken.

A cushioning member, such as 30, (see Fig. 3,) may be located in the bottom of the hollow bore in the column 25, the function of which will be obvious.

Figure 3:
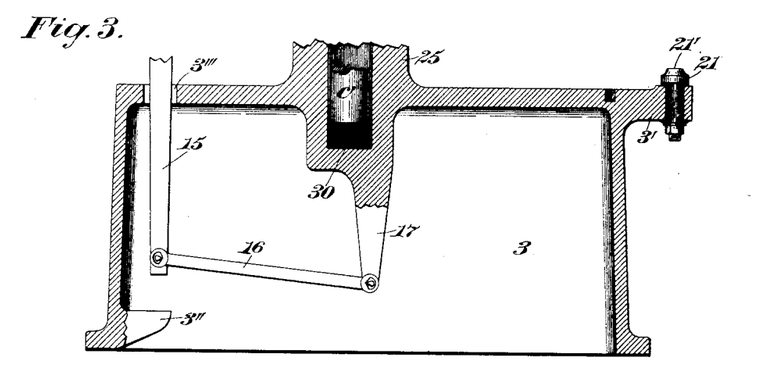
Fig. 3 is a sectional side elevation of the lower portion or base of the machine and the parts carried thereby.
Figure 4:
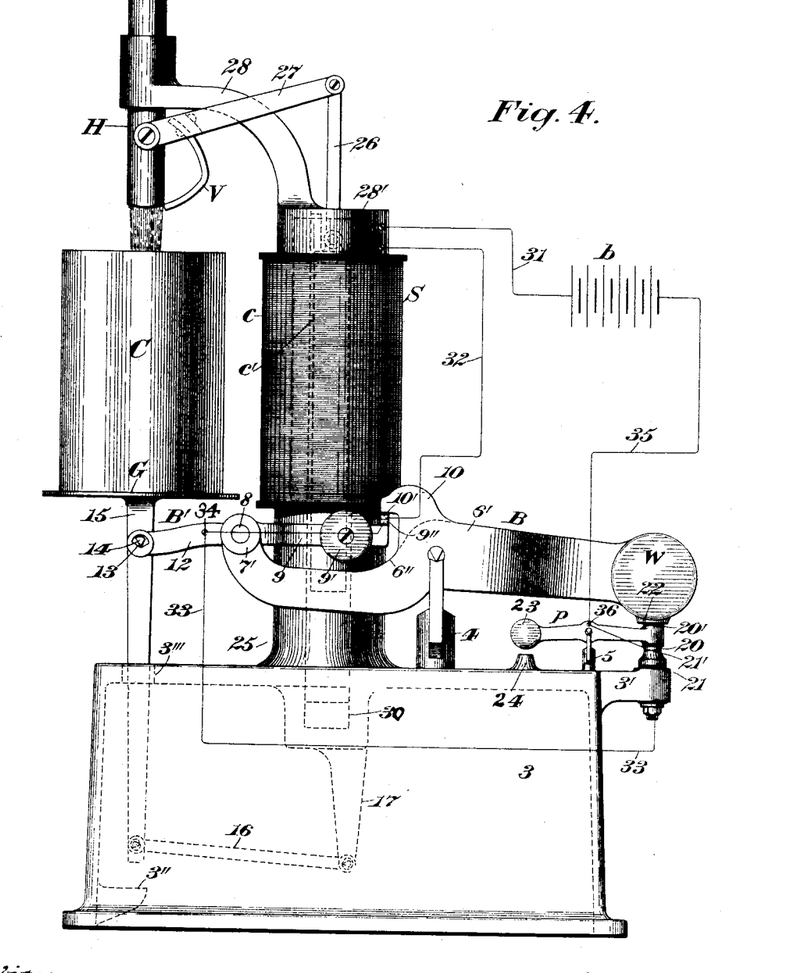
Fig. 4 is a view similar to Fig. 1, illustrating the parts in their working positions with the valve open and the supply-spout delivering material to a package or can.

Any suitable source of energy, such as that shown at $b$, may be employed for energizing the solenoid, this source of energy or generator being connected by a conductor 31 with one of the terminals of the solenoid, while the other terminal of the latter is connected by a conductor 32 with the stop member 10' on the stop-arm 10 of the primary beam mechanism, which stop member is insulated from the stop-arm and constitutes a contact-maker. The other stop member 9" on the scale-arm 9 of the secondary beam mechanism is also insulated from its arm and constitutes a coöperative contact-maker or circuit-controller connected by means of a conductor 33, passing around an insulating-stud 34, to the stud 21, hereinbefore referred to, which last-mentioned stud, as will be obvious by reference to Fig. 3, is mounted in and insulated from a bracket, such as 3', projecting from the base 3.

The stop-face 20 of the poising device $p$ is also insulated from the body portion of such device and constitutes a contact member or circuit-controller coöperative with a corresponding contact-face 21' of the stud 21. From the contact member 20 a conductor, such as 35, passes around an insulating-stud, such as 36, near the pivot of the poising device $p$ and connects with the opposite side of the generator $b$.

For the purpose of limiting the descent of the weighing mechanism I have illustrated at 3" a stop coöperative with the lower end of the arm 15 of the load-receiver or package-carrier, which arm passes through an opening, such as 3''', in the upper side of the base of the machine.

Figure 5:
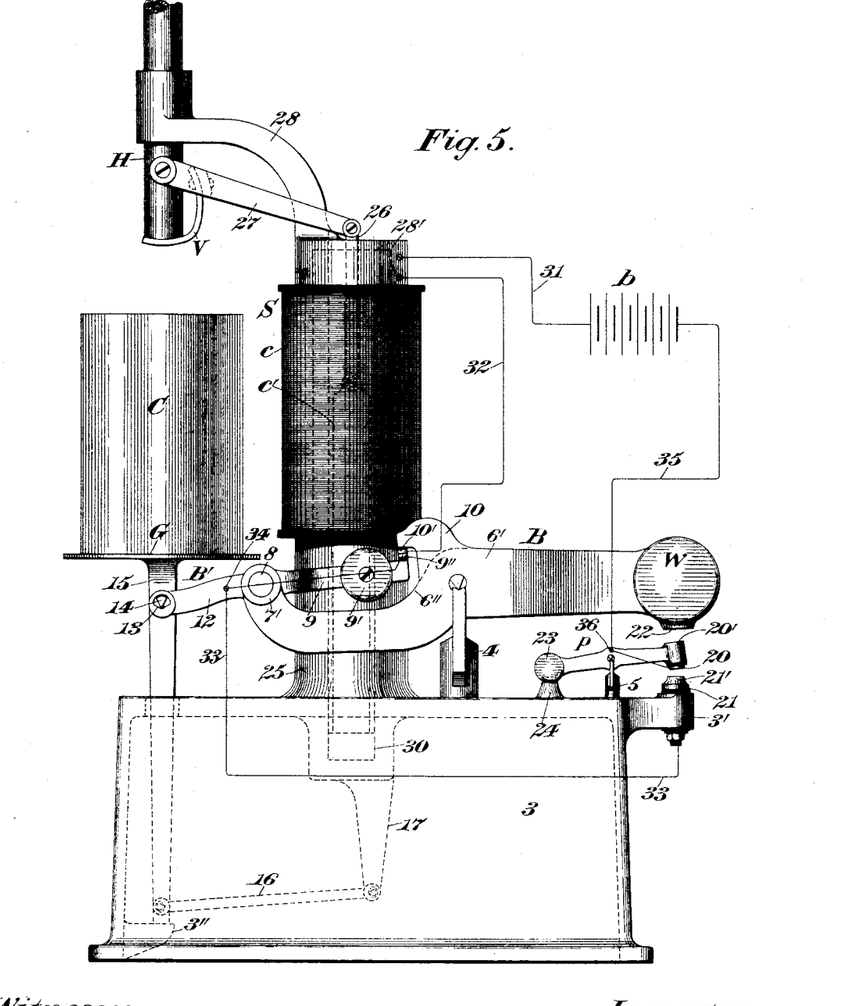
Fig. 5 is a similar view illustrating the positions assumed by the parts on the completion of a load and the overpoising of the beam mechanism.

The operation of the improved weighing-machine forming the subject-matter of my present improvements, as embodied in the construction illustrated in the drawings of this application, is as follows: It being understood that the parts are in their normal idle positions, (shown in Fig. 1,) it will be seen that the valve is closed, the solenoid deënergized, the secondary beam mechanism counterpoised and the circuit broken at 9", and the poising device $p$ normally forming part of the weighing mechanism and closing the break in the circuit at 20. As soon as a package or can C of the proper weight is placed upon the receiver G the poising side of the secondary beam mechanism will descend, and the circuit-controller thereof will make contact at 9" with the contact member 10', this completing the circuit through the solenoid. If, however, the can is of light weight, the arm 12 will not descend, and this circuit will not be formed, and hence the solenoid will not be energized to open the valve. If the can is too heavy, the too rapid descent of the arm 12 may be noted by the attendant, whereupon the can may be removed at once from the receiver G and another substituted. If, however, the can is of the determined standard weight and the circuit is properly closed and the solenoid energized, the core $c'$ will be drawn up and the valve V opened through the operating connections 26 and 27. Material will now be delivered from the supply-spout H to the can C until the proper charge is made up in the latter. As soon as the can begins to descend the counterpoising side of the primary beam mechanism will rise, and the circuit at the normally closed break controlled by the poising device $p$ will be broken and said poising device will shift to the position shown in Fig. 5.

It will be noted that the rising of the weight W causes not only the breaking of the circuit at this point, but shortly afterward the shifting of this poising device off from the weighing mechanism of the machine. The breaking of the circuit of course causes the deënergization of the solenoid, and the core $c'$ drops by gravity, thus cutting off the supply from the spout H. The poising side of the weighing mechanism will stay down until the can or receptacle C is removed, whereupon the circuit will be immediately broken at 9", thus preventing the remaking of the circuit until a new can is put in place, and immediately after said filled can is removed the primary weighing mechanism will return to its normal position (shown in Fig. 1) and close the break again at 20.

Having described my invention, I claim—

1. The combination, in an automatic weighing-machine, of stream-supplying means; automatically-operative stream-controlling means; automatic primary weighing means coöperative with the stream-controlling means for making up automatically predetermined loads; and secondary receiver-weighing means movable with the primary weighing means and operative for determining the weight of a receiver independently of the primary weighing action, for determining the weight of the load.

2. The combination, in an automatic weighing-machine, of stream-supplying means; automatically-operative stream-controlling means; automatic primary weighing mechanism coöperative with the stream-controlling means for making up automatically predetermined loads; and secondary receiver-weighing mechanism mounted on the primary weighing mechanism and operative for determining the weight of a receiver independently of the primary weighing action, for determining the weight of the load.

3. The combination, in an automatic weighing-machine, of stream-supplying means; automatically-operative stream-controlling means; automatic primary weighing means coöperative with the stream-controlling means for making up automatically predetermined loads; poise-regulating means; and secondary receiver-weighing means movable with the primary weighing means and operative for determining the weight of a receiver independently of the primary weighing action for determining the weight of the load.

4. The combination, in an automatic weighing-machine, of stream-supplying means; automatically-operative stream-controlling means; automatic primary weighing mechanism coöperative with the stream-controlling means for making up automatically predetermined loads; and secondary receiver-weighing mechanism mounted on the primary weighing mechanism for movement therewith, and operative for determining the weight of a receiver independently of the primary weighing action for determining the weight of a load, and embodying secondary poise-regulating means.

5. The combination, in an automatic weighing-machine, of stream-supplying means; automatically-operative stream-controlling means; automatic primary weighing mechanism coöperative with the stream-controlling means for making up automatically predetermined loads; and secondary receiver-weighing mechanism mounted on the primary weighing mechanism for movement therewith, and operative for determining the weight of a receiver independently of the primary weighing action for determining the weight of the load, and embodying an adjustable secondary poise-weight.

6. The combination, in an automatic weighing-machine, of stream-supplying means; automatically-operative stream-controlling means; automatic primary weighing mechanism coöperative with the stream-controlling means for making up automatically predetermined loads; and secondary receiver-weighing mechanism mounted on the primary weighing mechanism for movement therewith, and operative for determining the weight of a receiver independently of the primary weighing action for determining the weight of the load, and embodying a scale-arm and an adjustable poise-weight slidable along said scale-arm.

7. The combination, in an automatic weighing-machine, of stream-supplying means; automatically-operative stream-controlling means; automatically-operative counterpoised primary beam mechanism coöperative with the stream-controlling means for making up automatically predetermined loads; and counterpoised secondary receiver-weighing beam mechanism pivoted on the poising side of the primary beam mechanism, and operative for determining the weight of a receiver independently of the primary weighing action for determining the weight of the load.

8. The combination, in an automatic weighing-machine, of stream-supplying means; automatically-operative stream-controlling means; automatic primary weighing means coöperative with the stream-controlling means for making up automatically predetermined loads; and secondary receiver-weighing means movable with the primary weighing means and operative for determining the weight of a receiver independently of the primary weighing action for determining the weight of the load, said two weighing means having a common load-receiver.

9. The combination, in an automatic weighing-machine, of stream-supplying means; automatically-operative stream-controlling means; automatic primary weighing means coöperative with the stream-controlling means for making up automatically predetermined loads; and secondary receiver-weighing means movable with the primary weighing means and embodying the load-receiver of the latter, and operative for determining the weight of said load-receiver independently of the primary weighing action for determining the weight of the load.

10. The combination, in an automatic weighing-machine, of stream-supplying means; automatically-operative stream-controlling means; automatic primary weighing means coöperative with the stream-controlling means for making up automatically predetermined loads; and secondary receiver-weighing means movable with the primary weighing means and embodying a load-receiver pivotally supported thereon and operative for determining the weight of said load-receiver independently of the primary weighing action for determining the weight of the load.

11. The combination, in an automatic weighing-machine, of stream-supplying means; automatically-operative stream-controlling means; automatically-operative counterpoised primary beam mechanism coöperative with the stream-controlling means for making up automatically predetermined loads; and counterpoised secondary receiver-weighing beam mechanism pivoted on the poising side of the primary beam mechanism and embodying a load-receiver pivotally supported on the poising side thereof and operative for determining the weight of said load-receiver independently of the primary weighing action for determining the weight of the load.

12. In an automatic weighing-machine, the combination, with weighing means embodying a poising device movable relatively to the main weighing means, of a circuit-controller carried directly by and on said poising device.

13. In an automatic weighing-machine, the combination, with weighing means embodying a poising device movable relatively to the main weighing means, and a pair of coöperative contact-makers carried, respectively, by the main weighing means and the poising device, of an electric circuit including said contact-makers.

14. In an automatic weighing-machine, the combination, with primary beam mechanism embodying a contact-maker, of secondary beam mechanism mounted thereon for movement therewith and embodying a contact-maker coöperative with that of the primary beam mechanism, and an electric circuit including said contact-makers.

15. In an automatic weighing-machine, the combination, with weighing means embodying a pair of independently-operable poising devices movable relatively to the main weighing means, of a pair of circuit-controllers controlled, respectively, by said respective poising devices.

16. In an automatic weighing-machine, the combination, with a support, of weighing mechanism carried by said support and embodying a pair of independently-operable poising devices movable relatively to the main weighing mechanism and one carried by such main weighing mechanism and the other by the support, and a pair of circuit-controllers controlled, respectively, by said respective poising devices.

17. In an automatic weighing-machine, the combination, with a support, of weighing mechanism carried by said support and embodying a pair of independently-operable poising devices movable relatively to the main weighing mechanism and one pivotally supported on such main weighing mechanism and the other pivotally mounted on the support, and a pair of circuit-controllers controlled, respectively, by said respective poising devices.

18. In an automatic weighing-machine, the combination, with a support, of weighing mechanism carried by said support and embodying a pair of independently-operable poising devices movable relatively to the main weighing mechanism and one carried by such main weighing mechanism and the other mounted on said support and shiftable off from the weighing mechanism at a determined point in the movement thereof, and a pair of circuit-controllers controlled, respectively, by said respective poising devices.

19. In an automatic weighing-machine, the combination, with weighing means embodying a load-receiver movable therewith and relatively thereto, of an electrical circuit-controller controlled by the movement of the load-receiver relatively to the main weighing means.

20. In an automatic weighing-machine, the combination, with weighing means embodying a load-receiver movable therewith and relatively thereto, of a pair of electrical circuit-controllers controlled, respectively, by the main weighing means and the movement of the load-receiver relatively to the main weighing means.

21. In an automatic weighing-machine, the combination, with primary weighing means, of secondary weighing means movable therewith, and a pair of electrical circuit-controllers controlled, respectively, by the primary and the secondary weighing means.

22. In an automatic weighing-machine, the combination, with primary weighing means, of secondary weighing means movable therewith, and an electric circuit having two breaks controlled, respectively, by said respective weighing means.

23. In an automatic weighing-machine, the combination, with primary weighing means, of secondary weighing means movable therewith, and an electric circuit having a normally closed break controlled by the primary weighing means, and a normally open break controlled by the secondary weighing means.

24. In an automatic weighing-machine, the combination, with counterpoised primary beam mechanism, of counterpoised secondary beam mechanism pivoted on the poising side of the primary beam mechanism, and an electric circuit having a normally closed break controlled by the primary beam mechanism and adapted to be opened at a determined point in the descent thereof, and also having a normally open break controlled by the secondary beam mechanism and adapted to be closed at a determined point in the descent.

25. The combination, in an automatic weighing-machine, of stream-supplying means; automatically-operative stream-controlling means; automatically-operative counterpoised primary weighing mechanism coöperative with the stream-controlling means for making up automatically predetermined loads; and counterpoised load-receiving package-balancing secondary weighing mechanism having its counterpoising means of less efficiency than that of the primary weighing mechanism, and operative for determining the weight of a package independently of the primary weighing action for determining the weight of the load delivered to such package.

26. The combination, in an automatic weighing-machine, of stream-supplying means; automatically-operative stream-controlling means; automatically-operative counterpoised primary weighing mechanism coöperative with the stream-controlling means for making up automatically predetermined loads; a counterweighted load-receiving package-balancing secondary weighing mechanism having a counterweight of less efficiency than that of the primary beam mechanism, and operative for determining the weight of the package independently of the primary weighing action for determining the weight of the load delivered to such package.

27. The combination, in an automatic weighing-machine, of stream-supplying means; stream-controlling means; automatically-operating counterpoised primary weighing mechanism coöperative with the stream-controlling means; and counterpoised load-receiving package-balancing secondary weighing mechanism movable from a normal counterpoised position to another extreme position on the placing of a package thereon, and having its counterpoising means of less efficiency than that of the primary beam mechanism.

28. The combination, in an automatic weighing-machine, of stream-supplying means; stream-controlling means; automatically-operating counterpoised primary weighing mechanism coöperative with the stream-controlling means; counterpoised load-receiving package-balancing secondary weighing mechanism having a substantially flat package-carrier pivotally mounted on the poising side thereof, and also having its counterpoising means of less efficiency than that of the primary beam mechanism and movable from a normal counterpoised position to another extreme position on the placing of a package on the package-carrier.

29. In an automatic weighing-machine, the combination, with a supply-spout, of a stream-controller; a stream-controller actuator; an electric circuit controlling said actuator; weighing means embodying a poising device movable relatively to the main weighing means; and a circuit-controller carried directly by said poising device.

30. In an automatic weighing-machine, the combination, with a supply-spout, of a valve; a valve opening and closing actuator; an electric circuit controlling said actuator; weighing means embodying a poising device movable relatively to the main weighing means; and a circuit-controller carried directly by said poising device.

31. In an automatic weighing-machine, the combination, with a support, of weighing mechanism embodying counterpoised main weighing means mounted on said support and a poising device coöperative with and normally effective in opposition to the counterpoised side of the main weighing means.

32. In an automatic weighing-machine, the combination, with a support, of weighing mechanism embodying counterpoised main weighing means mounted on said support and a pivoted poising device mounted on the support independently of the main weighing means and coöperative with and normally effective in opposition to the counterpoised side of the latter.

33. In an automatic weighing-machine, the combination, with a support, of weighing mechanism embodying counterweighted beam mechanism and a poising device pivoted at different points on said support, said poising device normally acting on the beam mechanism in opposition to the counterweight of the latter.

34. In an automatic weighing-machine, the combination, with a support, of weighing mechanism embodying counterweighted beam mechanism pivoted on said support and a poising device independently pivoted on said support at the counterpoising side of the pivot of the beam mechanism, said poising device normally acting on the beam mechanism in opposition to the counterweight of the latter.

35. The combination, in an automatic weighing-machine, of stream-supplying means; stream-controlling means; automatically-operating counterpoised primary beam mechanism having a pair of beam-arms and coöperative with the stream-supplying means; and counterpoised secondary beam mechanism pivoted on the poising side of the primary beam mechanism between the beam-arms thereof.

FRANCIS H. RICHARDS.

Witnesses:
FRED. J. DOLE,
HEATH SUTHERLAND.